United States Patent [19]

Manabe

[11] Patent Number: 5,590,326
[45] Date of Patent: Dec. 31, 1996

[54] SHARED DATA MANAGEMENT SCHEME USING SHARED DATA LOCKS FOR MULTI-THREADING

[75] Inventor: Toshihiko Manabe, Kanagawa-ken, Japan

[73] Assignee: Kabushiki Kaisha Toshiba, Kawasaki, Japan

[21] Appl. No.: 305,354

[22] Filed: Sep. 13, 1994

[30] Foreign Application Priority Data

Sep. 13, 1993 [JP] Japan .................................. 5-226816

[51] Int. Cl.$^6$ ..................................................... G06F 12/00
[52] U.S. Cl. ........................... 395/477; 395/608; 395/412; 395/478; 395/726; 395/674
[58] Field of Search ..................................... 395/600, 650, 395/412, 477, 478, 726; 364/DIG. 1

[56] References Cited

U.S. PATENT DOCUMENTS

| | | | |
|---|---|---|---|
| 5,088,036 | 2/1992 | Ellis et al. | 395/425 |
| 5,179,702 | 1/1993 | Spix et al. | 395/650 |
| 5,339,415 | 8/1994 | Strout, II et al. | 395/650 |
| 5,404,521 | 4/1995 | Murray | 395/650 |
| 5,414,848 | 5/1995 | Sandage et al. | 395/650 |
| 5,430,850 | 7/1995 | Papadopoulos et al. | 395/375 |
| 5,524,247 | 6/1996 | Mizuno | 395/726 |

FOREIGN PATENT DOCUMENTS 0416768  3/1991  European Pat. Off. .

OTHER PUBLICATIONS

Paul R. Wilson, "Pointer Swizzling at Page Fault Time: Efficiently Supporting Huge Address Spaces on Standard Hardware", Technical Report UIC–EECS–90–6, Dec. 1990, pp. 1–8.

*Primary Examiner*—Thomas G. Black
*Assistant Examiner*—Jean R. Homere
*Attorney, Agent, or Firm*—Foley & Lardner

[57] ABSTRACT

A shared data management scheme capable of manipulating the shared data by the multi-threading without requiring the explicit programming of the lock in the program. In this scheme, different shared data identifiers are assigned to different threads, and different locks are set up for different shared data identifiers, so as to enable the detection of an access in violation to the locks among the accesses to the shared data for each thread separately. Preferably, the shared data required in an execution of each thread are mapped to a region exclusively allocated to each thread in a virtual space, in units of pages, a page protection of a memory management unit is set up with respect to each page mapping the shared data, and a lock for the shared data mapped to each page is automatically set up in response to an occurrence of an exception due to the page protection of the memory management unit caused by an access to the shared data mapped to each page from each thread.

15 Claims, 14 Drawing Sheets begin_transaction ( ) ;
p=(struct SD*) map (SA) ;
X=P → data ;
P → data=Y ;
end_transaction ( ) ;

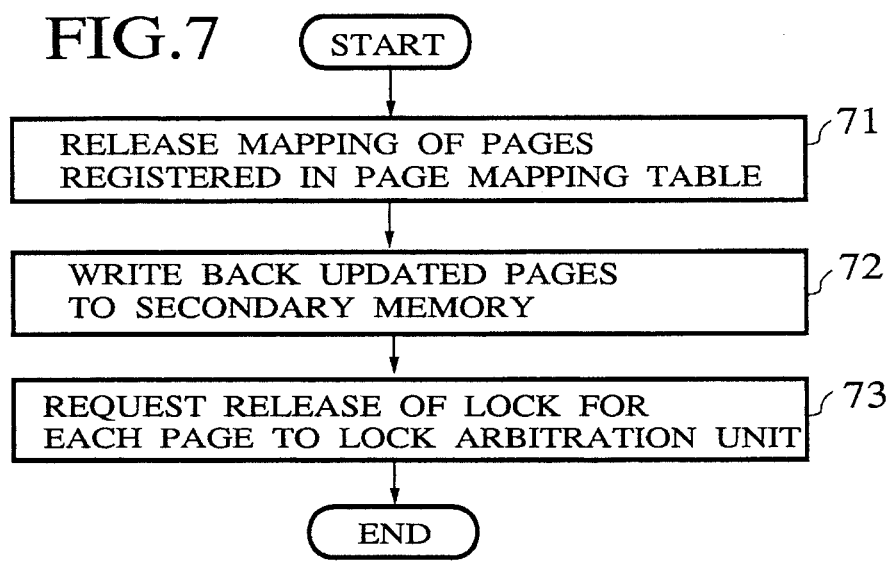
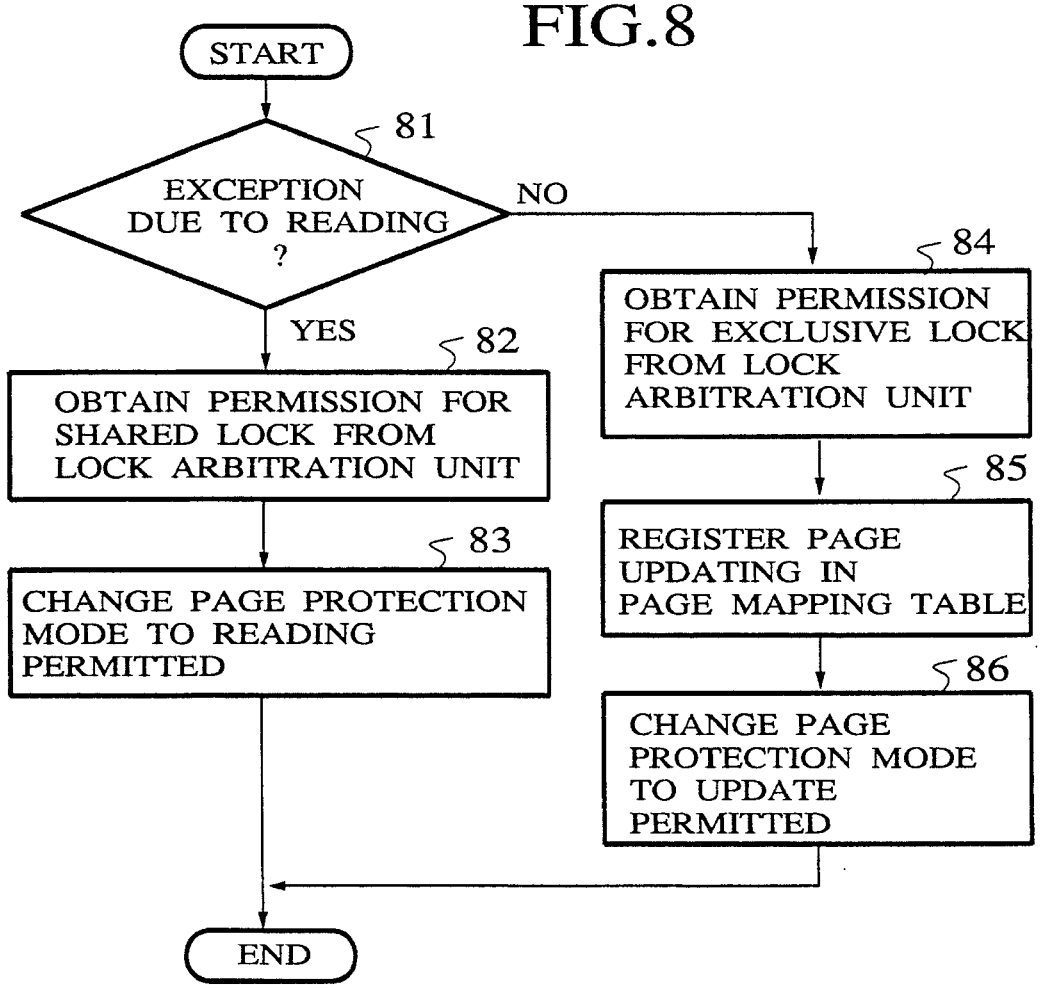

begin_transaction ( ) ; /*parent transaction*/
P1=(struct SD1* ) map (SA1) ;
.........
  begin_transaction ( ) ; /*child transaction*/
  P2=(struct SD2* ) map (SA2) ;
  .........
  end_transaction ( ) ;
.........
end_transaction ( ) ;

```
begin_transaction ( ) ;
..........
    para {
        begin_transaction ( ) ;
         ..........
        end_transaction ( ) ;
        begin_transaction ( ) ;
         ..........
        end_transaction ( ) ;
    }
..........
end_transaction ( ) ;
```

FIG.22 begin_transaction ( ) ;
IX=map2 (SA),
X=deref_rhs (IX)→data ;
deref_lhs (IX)→data=Y ;
end_transaction ( ) ;

FIG.23 transaction {
struct SD *P ; /*local variable of transaction*/
P=(struct SD*) map (SA) ;
................
}

SHARED DATA MANAGEMENT SCHEME USING SHARED DATA LOCKS FOR MULTI-THREADING

BACKGROUND OF THE INVENTION

1. Field of the Invention

The present invention relates to a processing system for processing shared data by multi-threads, such as a processing system using object oriented database system.

2. Description of the Background Art

The recent operating system is equipped with a function for executing a program by processing with multiple threads (multi-threading) in order to utilize the shared memory type multi-processor system effectively. In the multi-threading, a plurality of threads can be executed in parallel by sharing the virtual space of the process. In switching the threads, there is no need to switch the virtual space, and only the minimum context switching is required. For this reason, it is possible to improve the performance of the parallel processing by the multi-processor system.

However, the multi-threading has a drawback in that the programming becomes rather complicated. This is because the virtual space is to be shared among the threads so that it is necessary to program the exclusive control explicitly whenever the shared data is involved.

Even in the single thread program, the exclusive control can be a problem when the data mapped to the virtual space is to be shared among the processes, as in a case of the object-oriented database system. In the object-oriented database system, the data in the secondary memory can be mapped into the virtual space and manipulated just like the ordinary data. Here, the data mapped from the secondary memory into the virtual space have a possibility of being shared by a plurality of processes, so that the exclusive control using the lock is necessary at a time of reading or updating these data. In the transaction processing, if this lock is not set up correctly, the inconsistent data can be produced in the secondary memory, and the bug of one program can affect the other programs as well.

In order to resolve this problem of the exclusive control, an automatic locking scheme has been developed for the single thread program, which utilizes the idea of single level storage. In this scheme, the set up of the lock is made by detecting the access in violation to the page protection of the MMU (memory management unit). Namely, a page having data mapped from the secondary memory is set to be in the access prohibited mode initially, such that the access exception of the MMU occurs when this data is read for the first time. Then, in the resulting exception processing, the shared lock for reading is obtained from the database management system which manages the secondary memory, and then the page protection mode is changed to the reading permitted mode. As a result, the access exception does not occur in the subsequent accesses for reading and the reading operations can be carried out as usual. Similarly, the exception occurs when this data is updated for the first time, in which case the exclusive lock for updating is obtained from the database management system in the resulting exception processing and then the page protection mode is changed to the writing permitted mode, such that the exception does not occur in the subsequent accesses for updating and the writing operations can be carried out as usual. In this manner, the exclusive control is realized without requiring the programmer to program the lock explicitly. See, E. Shekita et al.: "Cricket: A Mapped, Persistent Object Store", Proc. of the 4th Intl. Workshop on Persistent Object Systems Design, Implimentation and Use, pp. 89–102, September 1990, for further detail.

Now, this automatic locking scheme is not applicable to the program for the multi-threading, because in the multi-threading, the virtual space is shared by the threads so that the change of the page protection mode by one thread is also reflected in the other threads as well. Namely, as shown in FIG. 1, in the multi-threading environment for a process 5 using a plurality of threads 50 and a virtual space 30, the shared data 20 of the secondary memory 2 are going to be mapped into the shared data mapping region 300 in the virtual space 30 which is common to all the threads 50. In such a case, the data updated by one thread can be read or updated by the other threads before the lock is released by that one thread, for example. Consequently, in order to automate the exclusive control in the multi-threading, it is necessary to carry out the locking operation whenever there is an access to the shared data. Yet, this locking operation deals with the lock which is the shared resource, so that it must be carried out in the critical section which can be executed by only one thread. Thus, when the locking operation is carried out for each access in this manner, the extra processing is going to be required for each access to the shared data, so that the performance of the program can be lowered considerably and the parallelism of the threads can also be lowered.

As described, the program for manipulating the shared data by the multi-threading has been associated with the problem that the lock must be programmed explicitly so that the programming becomes complicated, or that the exclusive control must be carried out for each access, so that it is impossible to take a full advantage of the high performance supported by the multi-threading. Of these, the former problem gives rise to a further problem that the programs executable by the conventional single thread cannot be used as they are in the multi-threading environment so that there arises a need to rewrite all such programs. On the other hand, the latter problem gives rise to a further problem that the parallelism of the threads is going to be lowered as the access to the shared data must be made in the critical section of the thread.

SUMMARY OF THE INVENTION

It is therefore an object of the present invention to provide a shared data management scheme and system capable of manipulating the shared data by the multi-threading without requiring the explicit programming of the lock in the program.

According to one aspect of the present invention there is provided a method for managing shared data to be accessed by multiple threads, comprising the steps of: assigning different shared data identifiers, to be used in identifying the shared at a time of making accesses to the shared data, to different threads; setting up different locks for different shared data identifiers assigned at the assigning step; and detecting an access in violation to the locks set up at the setting step among the accesses to the shared data made from the threads by using the shared data identifiers assigned at the assigning step.

According to another aspect of the present invention there is provided a method for managing shared data to be accessed by multiple threads, comprising the steps of: (a) mapping the shared data required in an execution of each thread to a region exclusively allocated to said each thread in a virtual space, in units of pages; (b) setting up a page protection of a memory management unit for managing the virtual space, with respect to each page to which the shared data are mapped at the step (a); and (c) automatically setting up a lock for the shared data mapped to each page in response to an occurrence of an exception due to the page protection of the memory management unit set up by the step (b) which is caused by an access to the shared data mapped to each page from said each thread.

According to another aspect of the present invention there is provided a system for managing shared data to be accessed by multiple threads, comprising: means for assigning different shared data identifiers, to be used in identifying the shared at a time of making accesses to the shared data, to different threads; means for setting up different locks for different shared data identifiers assigned by the assigning means; and means for detecting an access in violation to the locks set up by the setting means among the accesses to the shared data made from the threads by using the shared data identifiers assigned by the assigning means.

According to another aspect of the present invention there is provided a system for managing shared data to be accessed by multiple threads, comprising: means for mapping the shared data required in an execution of each thread to a region exclusively allocated to said each thread in a virtual space, in units of pages; means for setting up a page protection of a memory management unit for managing the virtual space, with respect to each page to which the shared data are mapped by the mapping means; and means for automatically setting up a lock for the shared data mapped to each page in response to an occurrence of an exception due to the page protection of the memory management unit set up by the setting means which is caused by an access to the shared data mapped to each page from said each thread.

Other features and advantages of the present invention will become apparent from the following description taken in conjunction with the accompanying drawings.

BRIEF DESCRIPTION OF THE DRAWINGS

FIG. 7 is a flow chart for the operation to release a mapping of the shared data in the identifier management unit of FIG. 5.

FIG. 8 is a flow chart for the operation of a lock set up unit in the first embodiment of the shared data management scheme shown in FIG. 2.

FIG. 22 is an illustration of an exemplary program for the transaction processing to be handled by the third embodiment of the shared data management scheme shown in FIG. 21.

FIG. 23 is an illustration of a new syntax for a program to be handled by the third embodiment of the shared data management scheme shown in FIG. 21.

DETAILED DESCRIPTION OF THE PREFERRED EMBODIMENTS

Figure 1:
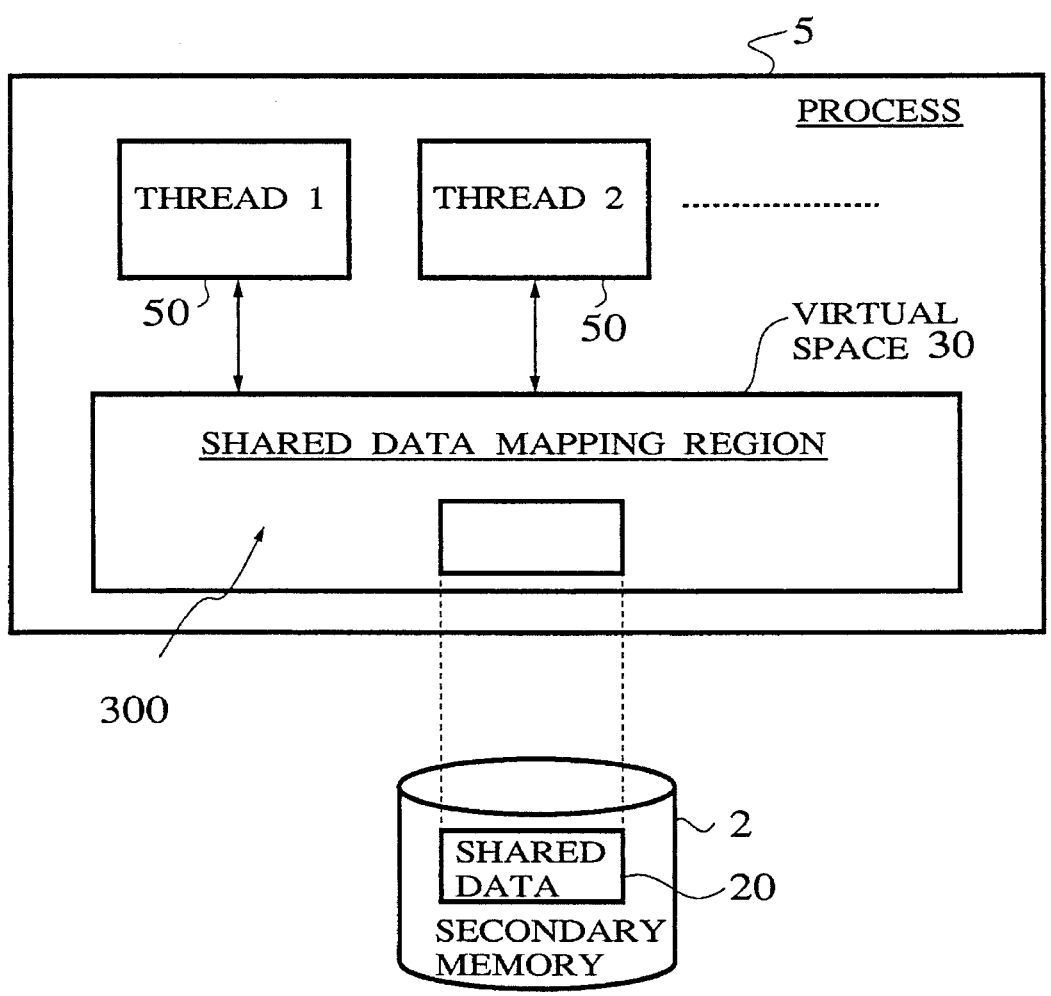
FIG. 1 is a schematic diagram of a relationship between threads and shared data in the conventional multi-threading environment.
Figure 2:
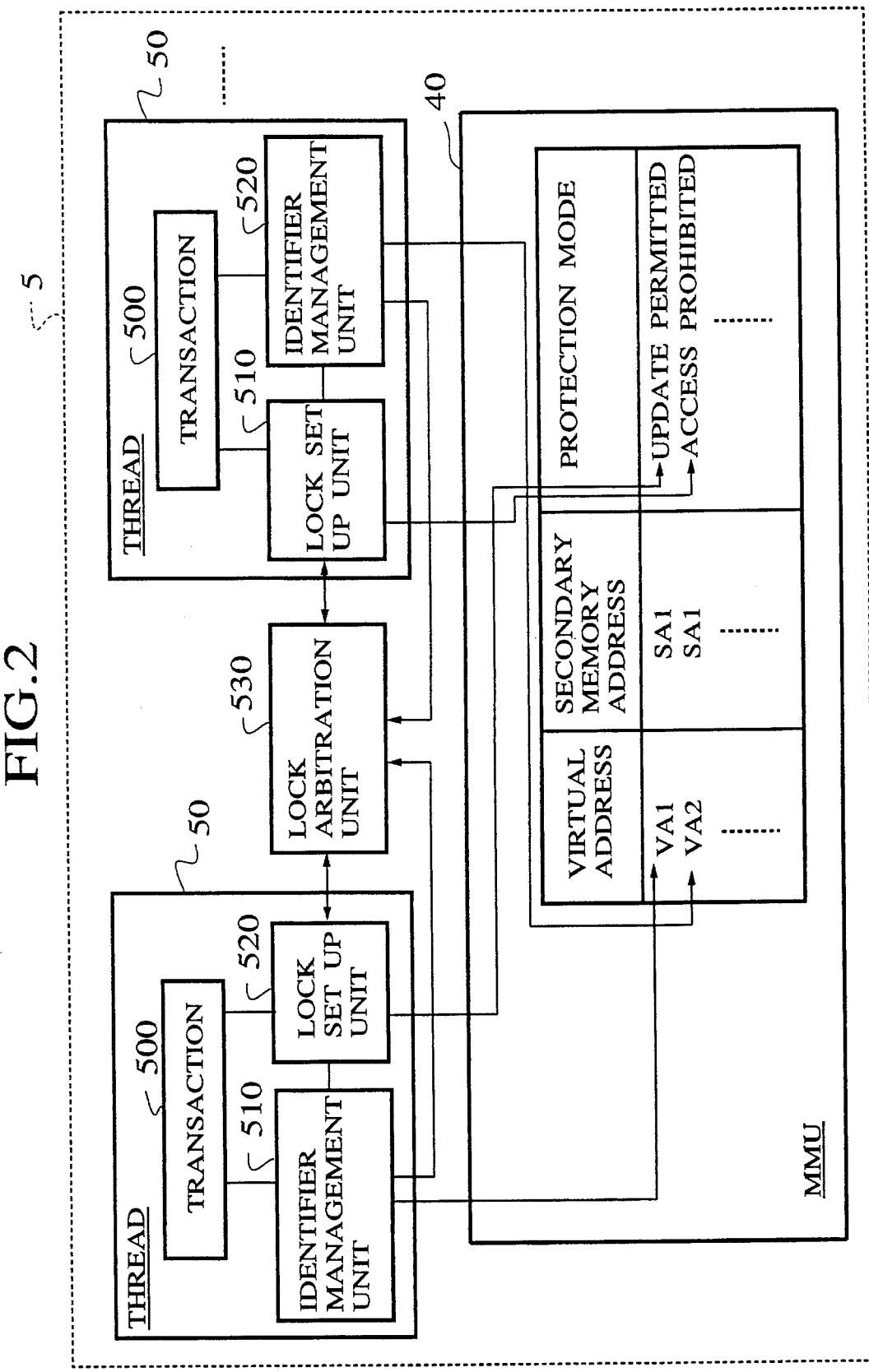
FIG. 2 is a schematic diagram of a functional configuration of the first embodiment of the shared data management scheme according to the present invention.

Referring now to FIG. 2, the first embodiment of the shared data management scheme according to the present invention will be described.

FIG. 2 shows a functional configuration in this first embodiment, in which the process 5 has multiple threads 50 executing the processing of transactions 500 in parallel. In this transaction processing, the shared data in the secondary memory are mapped into the thread mapping regions provided within the virtual space in correspondence to the multiple threads 50, so as to enable each thread to read or update the shared data, and the exclusive control using two phase locks is carried out by utilizing an MMU (memory management unit) 40 which has a table with each entry registering a virtual address, a secondary memory address and a protection mode in correspondence. In each thread 50, the identifier management unit 510 maps the shared data to the thread mapping region, and converts the secondary memory addresses of the shared data into the virtual addresses, while the lock set up unit 520 sets up the protection mode of the MMU 40 for the page to which the shared data are mapped in the virtual space as the lock for the shared data, such that the access in violation to the protection mode can be detected as the exception of the MMU 40. In addition, there is provided a lock arbitration unit 530 connected with the lock set up unit 520 of each thread 50, which arbitrates the lock requests from the different threads 50 with respect to the same shared data mapped into the different thread mapping regions.

Figures 3, 4:
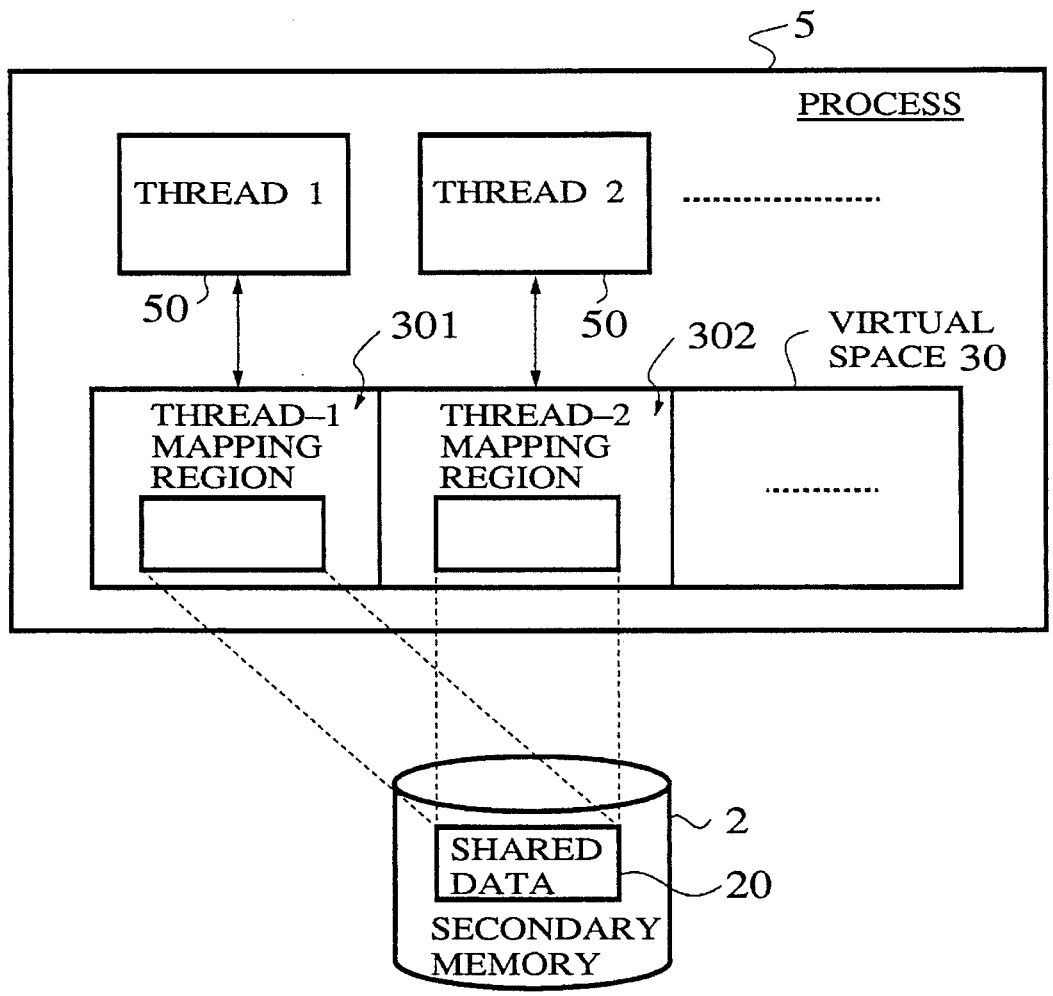
FIG. 3 is a schematic diagram of a relationship between threads and shared data in the first embodiment of the shared data management scheme shown in FIG. 2.
FIG. 4 is an illustration of an exemplary program for the transaction processing to be handled by the first embodiment of the shared data management scheme shown in FIG. 2.

FIG. 3 shows the relationship between each thread 50 and the shared data, where the threads 50 have the respective thread mapping regions such as the thread-1 mapping region 301, thread-2 mapping region 302, etc. provided in correspondence to the threads 50 in the virtual space 30, for storing the shared data 20 in the secondary memory 2.

FIG. 4 shows an exemplary program for the transaction processing to be executed by the threads 50, written in accordance with the syntax of the C language.

Now, the operation in this first embodiment will be described for an exemplary case of executing the program of FIG. 4.

In the program of FIG. 4, the first line expresses the start of the transaction, while the second line expresses the call up of the identifier management unit 510 to map the shared data 20 in the secondary memory 2 into the virtual space 30, where "map" is a function for calling up the identifier management unit 510 which takes the secondary memory address as its argument and returns the corresponding virtual address of the mapped region. Here, the identifier management unit 510 of each thread 50 sets up the protection mode for the page having the mapped region to be the access prohibited mode. In FIG. 4, "SA" appearing in the second line indicates the secondary memory address of the shaped data 20 to be mapped, while "struct SD" indicates a type of the shared data. In this first embodiment, the mapping to the virtual space 30 is carried out in units of pages, and the shared data 20 are assumed to be not straddling over the page boundary. However, a case of handling the shared data straddling over the page boundary can also be realized by giving the size of the shared data to another "map" function which takes it as second argument and judging the number of pages to be mapped by the identifier management unit 510.

The third line in FIG. 4 expresses the reading of the member of the shared data 20 called "data". Here, the page of this shared data 20 is set in the access prohibited mode, so that the exception of the MMU 40 is caused. Then, in this first embodiment, the lock set up unit 520 is called up in this exception processing. The lock set up unit 520 obtains the permission for setting up the shared lock by calling up the lock arbitration unit 530, and changes the protection mode of the page to be the reading permitted mode. The lock arbitration unit 530 does not return any response until it becomes possible to permit the requested lock. When the return from the exception processing is made, the protection mode of the page has been changed to be the reading permitted mode so that the reading of the shared data 20 can be carried out thereafter.

The fourth line in FIG. 4 expresses the update of the member of the shared data 20 called "data". Here, the page of the shared data 20 is set in the mode in which only the reading is permitted, so that the exception of the MMU 40 is caused. Similarly as in the case of the reading, the lock set up unit 520 is called up in this exception processing. The lock set up unit 520 obtains the permission for setting up the exclusive lock by calling up the lock arbitration unit 580, and changes the protection mode of the page to be the updating permitted mode. When the recovery from the exception processing is made, the protection mode of the page has been changed to be the updating permitted mode so that the updating of the shared data 20 can be carried out thereafter.

The fifth line in FIG. 4 expresses the end of the transaction. At this point, the identifier management unit 510 is called up again, and the mapping of the shared data mapped during the transaction is released while this releasing of the mapped shared data is notified to the lock arbitration unit S30.

Figure 5:
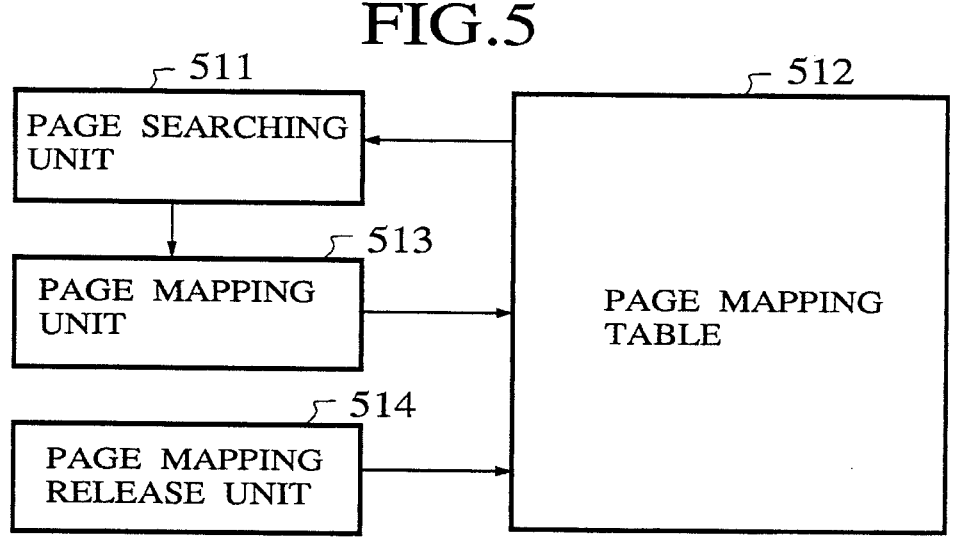
FIG. 5 is a block diagram of a conceptual configuration of an identifier management unit in the first embodiment of the shared data management scheme shown in FIG. 2.

The identifier management unit 510 of each thread 50 has a configuration as shown in FIG. 5, in which a page searching unit 511 is called up at a time of converting the secondary memory address of the shared data into the virtual address, and checks whether that shared data 20 are already mapped into the thread mapping region in the virtual space 30 according to a page mapping table 512.

A page mapping table 512 is provided for each transaction 500 independently, and records the virtual addresses of the already mapped pages in correspondence to their secondary memory addresses. In this first embodiment, the page mapping table 512 is to be managed independently for each transaction, so that it is possible to deal with a case of executing one transaction by a plurality of threads in parallel. This page mapping table 512 also records whether each mapped page has been updated or not as well.

The page searching unit 511 rounds up the secondary memory addresses handed as the arguments in units of pages, and searches through the page mapping table 512 for the transaction which called it up. When the virtual address of the already mapped page is obtained as a result, the virtual address in which the offset of that shared data within the page is added is returned to the program. In a case the virtual address of the mapped page cannot be found, the page searching unit 511 calls up a page mapping unit 513.

The page mapping unit 513 selects the empty page from the thread mapping region of the thread executing the transaction, and the page in the secondary memory 2 in which the shared data exist is mapped into the selected empty page. Here, the mapping is made in the mode in which the change in the virtual space is not reflected in the secondary memory, and the protection mode of that page is set to be the access prohibited mode. Then, the address of the page in the thread mapping region is registered into the page mapping table 512 in correspondence to the secondary memory address rounded up in units of pages, while the virtual address of the page added with the offset of the shared data is returned to the program.

Figure 6:
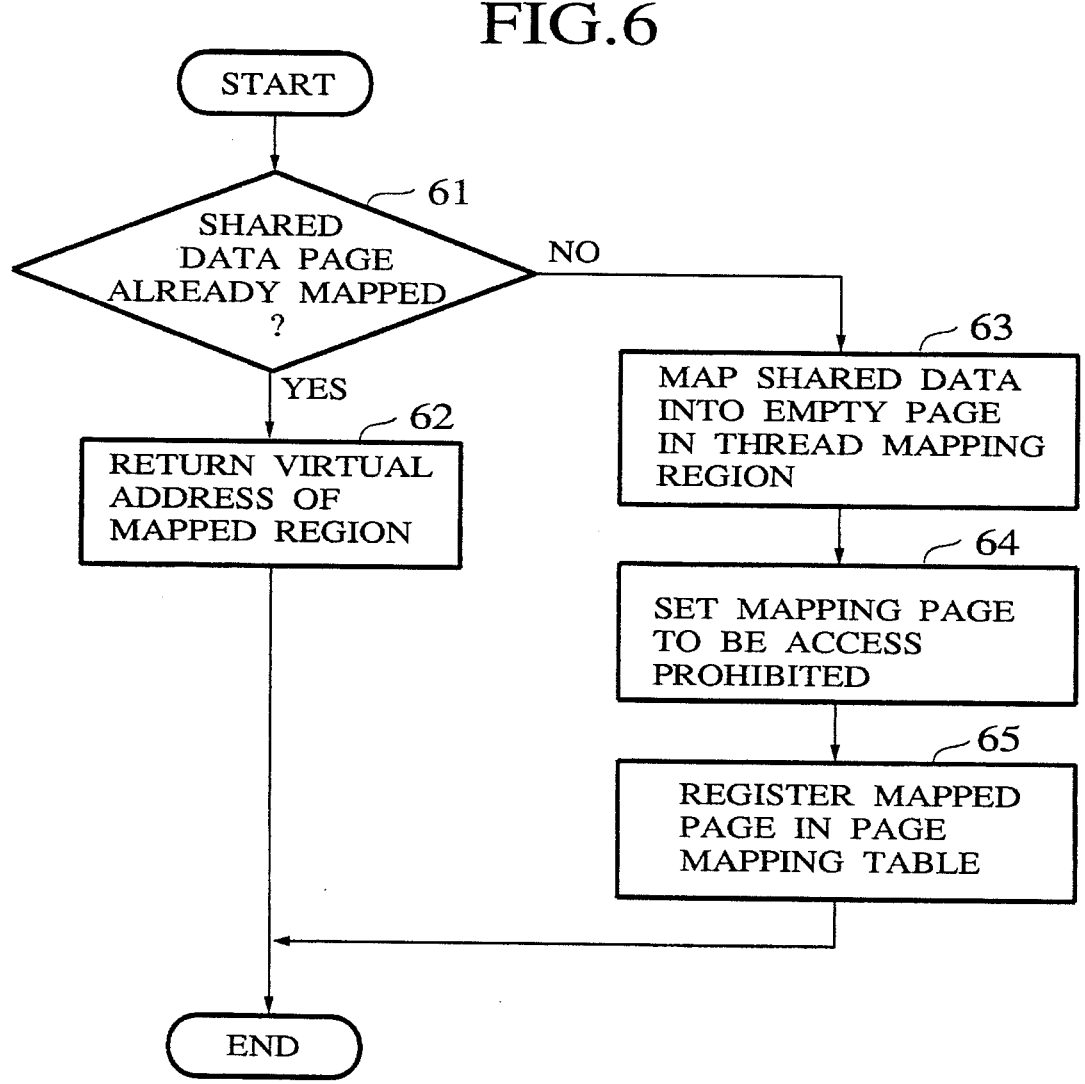
FIG. 6 is a flow chart for the operation to convert a secondary memory address of the shared data into a virtual address in the identifier management unit of FIG. 5.

Thus, the operation to convert the secondary memory address of the shared data into the virtual address proceeds according to the flow chart of FIG. 6 as follows.

First, whether the page of the shared data is already mapped or not is determined (step 61), and if so, the virtual address of the mapped region is returned (step 62). Otherwise, the shared data are mapped into an empty page in the thread mapping region (step 63) and the protection mode of the mapping page is set to be the access prohibited mode (step 64). Then, the mapped page is registered in the page mapping table 512 (step 65).

A page mapping release unit 514 is called up in order to release the mapping of the shared data at a time of ending the transaction. In this page mapping release unit 514, the page mapping table 512 is read and the mapping in each mapped page is released. When the transaction is ended normally, the updated page is written back to the secondary memory 2 at this point. At the same time, the secondary memory address of each already mapped page is handed over to the lock arbitration unit 530 so as to notify the releasing of the mapping on that page. Then, the page mapping table 512 is cleared.

Thus, the operation to release the mapping of the shared data proceeds according to the flow chart of FIG. 7 as follows.

First, the mapping of the pages registered in the page mapping table 512 is released (step 71) and the updated pages are written back to the secondary memory 2 (step 72). Then, the lock arbitration unit 530 is requested to release the lock for each page (step 73).

Here, the page mapping table 512 is provided for each transaction independently in this first embodiment, but it is also possible to modify this first embodiment such that the page mapping table 512 is shared by all the transactions. In this case, the page mapping table 512 registers the mapped page information indicating the correspondence relationships among the secondary memory address, the transaction ID, and the virtual address. Then, the page searching unit 511 searches through the page mapping table 512 by using the secondary memory address and the transaction ID as the searching key to judge whether the shared data are already mapped for that thread or not. Also, the page mapping release unit 514 selects the page corresponding to the transaction ID of the ended transaction fro the page mapping table 512 and releases the mapping of that page.

On the other hand, the lock set up unit 520 of each thread 50 operates according to the flow chart of FIG. 8 as follows.

Namely, this lock set up unit 520 is called up in the exception processing of the MMU 40, and carries out the changing of the protection mode of the page according to the type of the access. Here, there are two types of accesses including the reading and the updating. When the exception due to the reading type access occurs (step 81 yes), the permission for the shared lock is obtained from the lock arbitration unit 530 (step 82), and the protection mode of the page which caused the exception is changed to the reading permitted mode (step 83). On the other hand, when the exception due to the updating type access occurs (step 81 no), the permission for the exclusive lock is obtained from the lock arbitration unit 530 (step 84), and the updating of the page is registered in the page mapping table 512 of the identifier management unit 510 (step 85). Then, the protection mode of the page which caused the exception is changed to the updating permitted mode (step 86).

Here, in order to obtain the permission for the lock, the secondary memory address of the mapped page and the requested type of the lock are notified to the lock arbitration unit 530. To this end, before the lock arbitration unit 530 is called up, the lock set up unit 520 inversely converts the virtual address of the page which caused the exception into the secondary memory address by using the page mapping table 512 of the currently executed transaction in the identifier management unit 510. The lock arbitration unit 530 does not return any response until it becomes possible to permit the requested lock.

Figure 9:
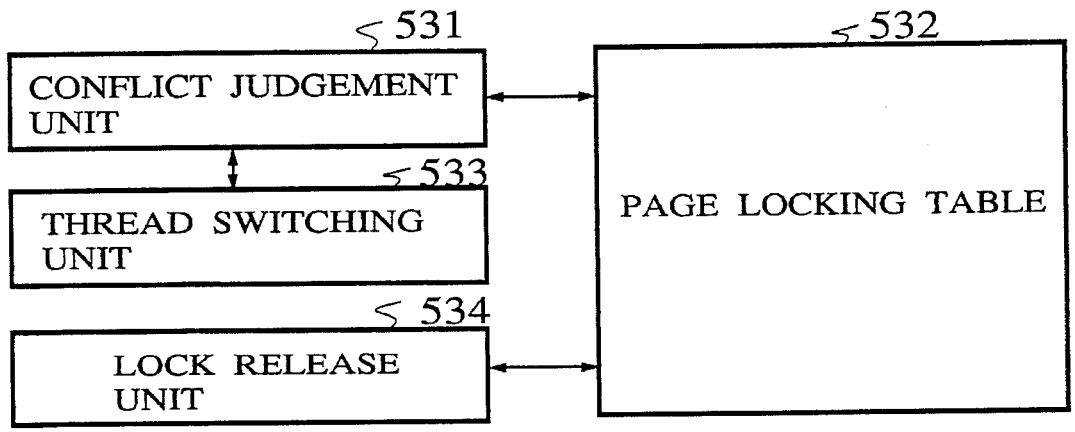
FIG. 9 is a block diagram of a conceptual configuration of a lock arbitration unit in the first embodiment of the shared data management scheme shown in FIG. 2.

The lock arbitration unit 530 is executed in a critical section and has a configuration as shown in FIG. 9 in which a conflict judgement unit 531 receives the secondary memory address of the page and the requested type of the lock from the lock set up unit 520, and returns the response for permitting the requested lock only when it becomes possible to set up the requested lock. Then, using the received secondary memory address as a key, a page locking table 532 is searched through. Here, the page locking table 532 is shared by all the threads 50, and the reason for using the secondary memory address as the searching key is that the shared data are mapped to the different pages for different threads 50 in the virtual space 30 so that the shared data cannot be uniquely identified by the virtual address. This page locking table 532 records the list of locked transactions and the types of already locked locks in correspondence to the secondary memory addresses in units of pages. Here, there are two types of locks including the shared lock and the exclusive lock.

The conflict judgement unit 531 judges whether the lock is in conflict or not according to the combination of the types of already locked locks and the list of locked transactions taken out from the page locking table 532 with the type of requested lock and the currently executed transaction. If there is no conflict, the page locking table 532 is rewritten to indicate the setting of the requested lock, and the permission for the requested lock is returned to the lock set up unit 520. On the other hand, if there is a conflict, a thread switching unit 533 is called up to switch the execution to the other thread, and the judgement of the conflict in this manner is repeated whenever the control returns to it.

Figure 10:
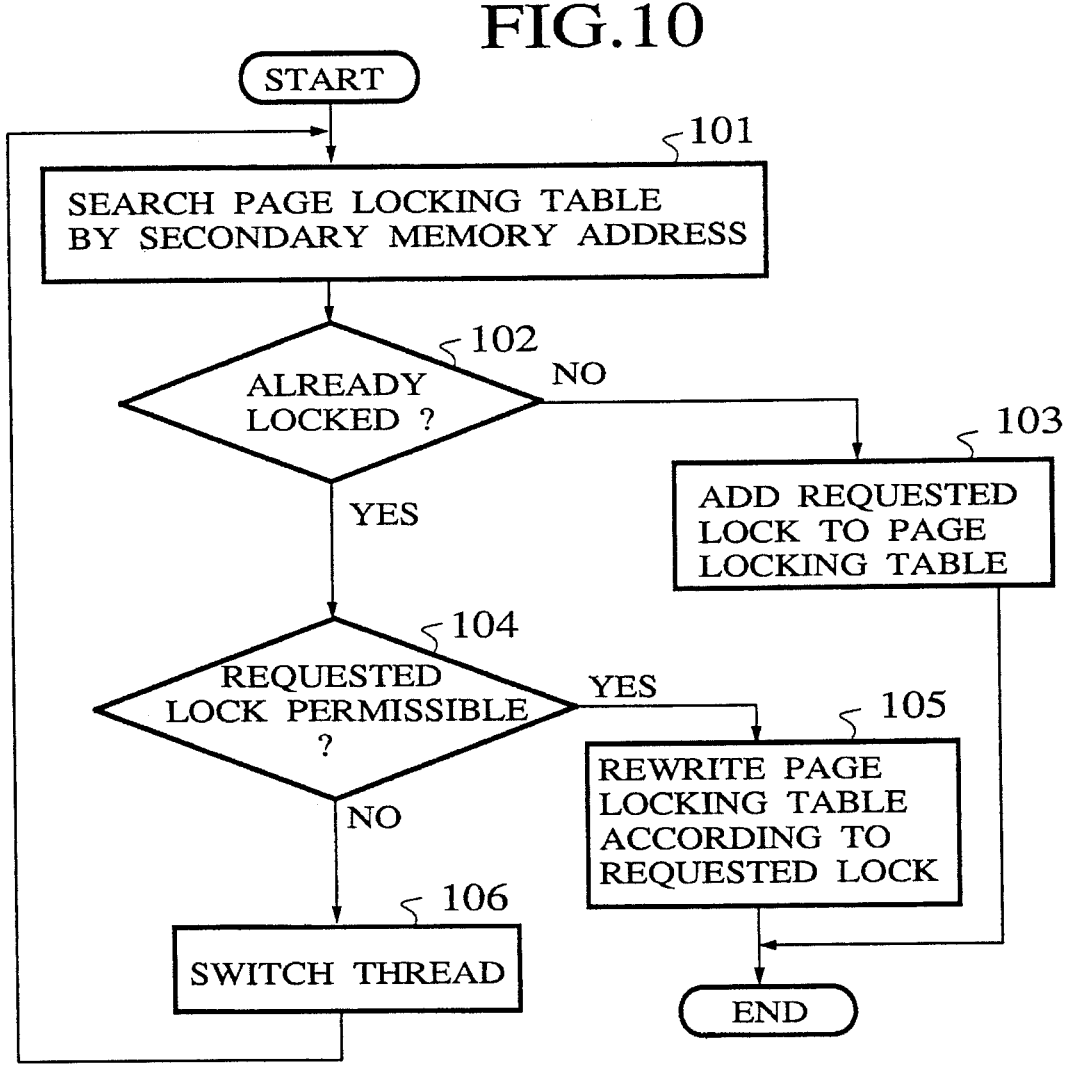
FIG. 10 is a flow chart for the operation of a lock conflict judgement unit in the lock arbitration unit of FIG. 9.

Thus, the operation of the lock conflict judgement unit 531 proceeds according to the flow chart of FIG. 10 as follows.

First, the page locking table 532 is searched through by using the secondary memory address as a searching key (step 101), and whether the requested lock is already locked or not is judged (step 102). If not, the requested lock is added to the page locking table 532 (step 103), whereas otherwise whether the requested lock is permissible or not is judged (step 1041). If permissible, the page locking table 532 is rewritten to add the requested lock (step 105), whereas otherwise the thread switching unit 533 is called up to switch the thread (step 106) and the operation is repeated for the next thread.

Figure 11:
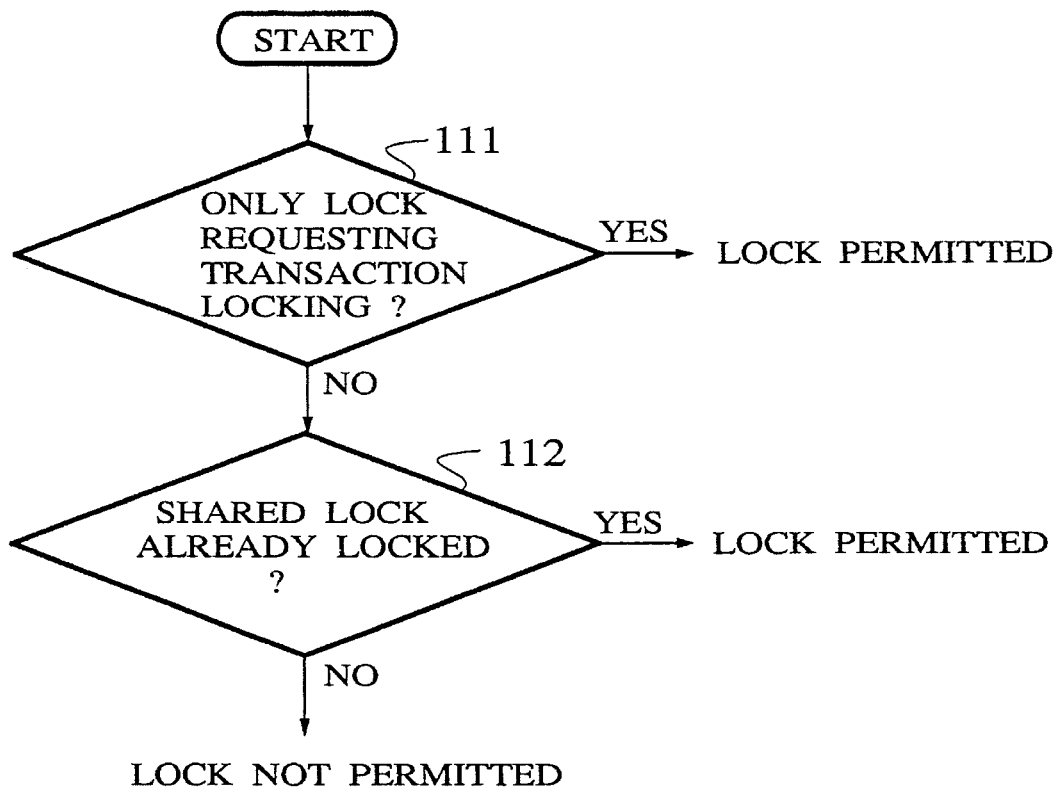
FIG. 11 is a flow chart for the operation of judging whether the requested lock is permissible or not in the flow chart of FIG. 10 in a case the requested lock is the shared lock.
Figure 12:
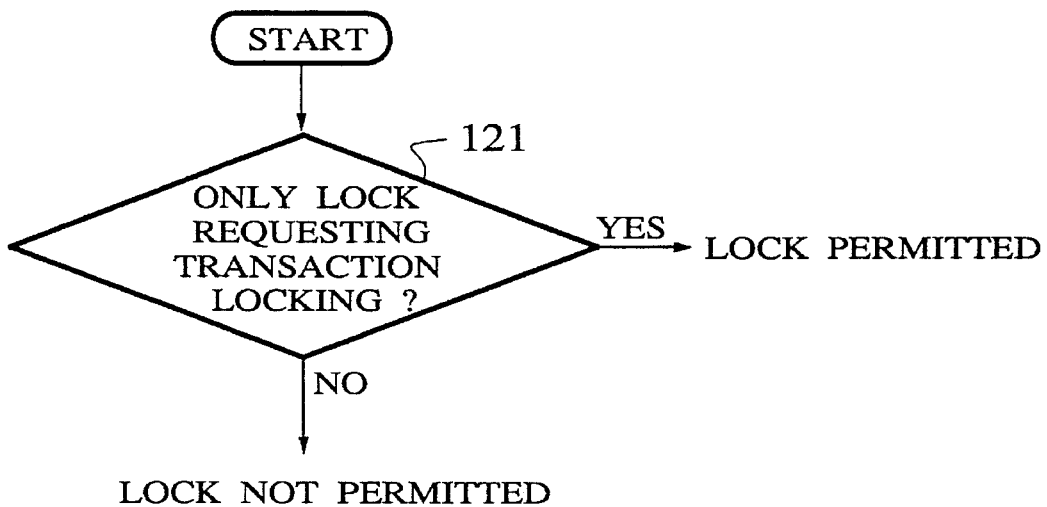
FIG. 12 is a flow chart for the operation of judging whether the requested lock is permissible or not in the flow chart of FIG. 10 in a case the requested lock is the exclusive lock.

Here, in a case the requested lock is the shared lock, the judgement of whether the requested lock is permissible or not at the step 104 is made as indicated in FIG. 11. Namely, whether only the transaction which is requesting the lock is locking or not is judged (step 111), and if so the requested lock is permitted. Otherwise, whether the shared lock is already locked or not is judged (step 112), and if so the requested lock is permitted, whereas otherwise the requested lock is not permitted. On the other hand, in a case the requested lock is the exclusive lock, the judgement of whether the requested lock is permissible or not at the step 104 is made as indicated in FIG. 12. Namely, whether only the transaction which is requesting the lock is locking or not is judged (step 121), and if so the requested lock is permitted, whereas otherwise the requested lock is not permitted.

Figure 13:
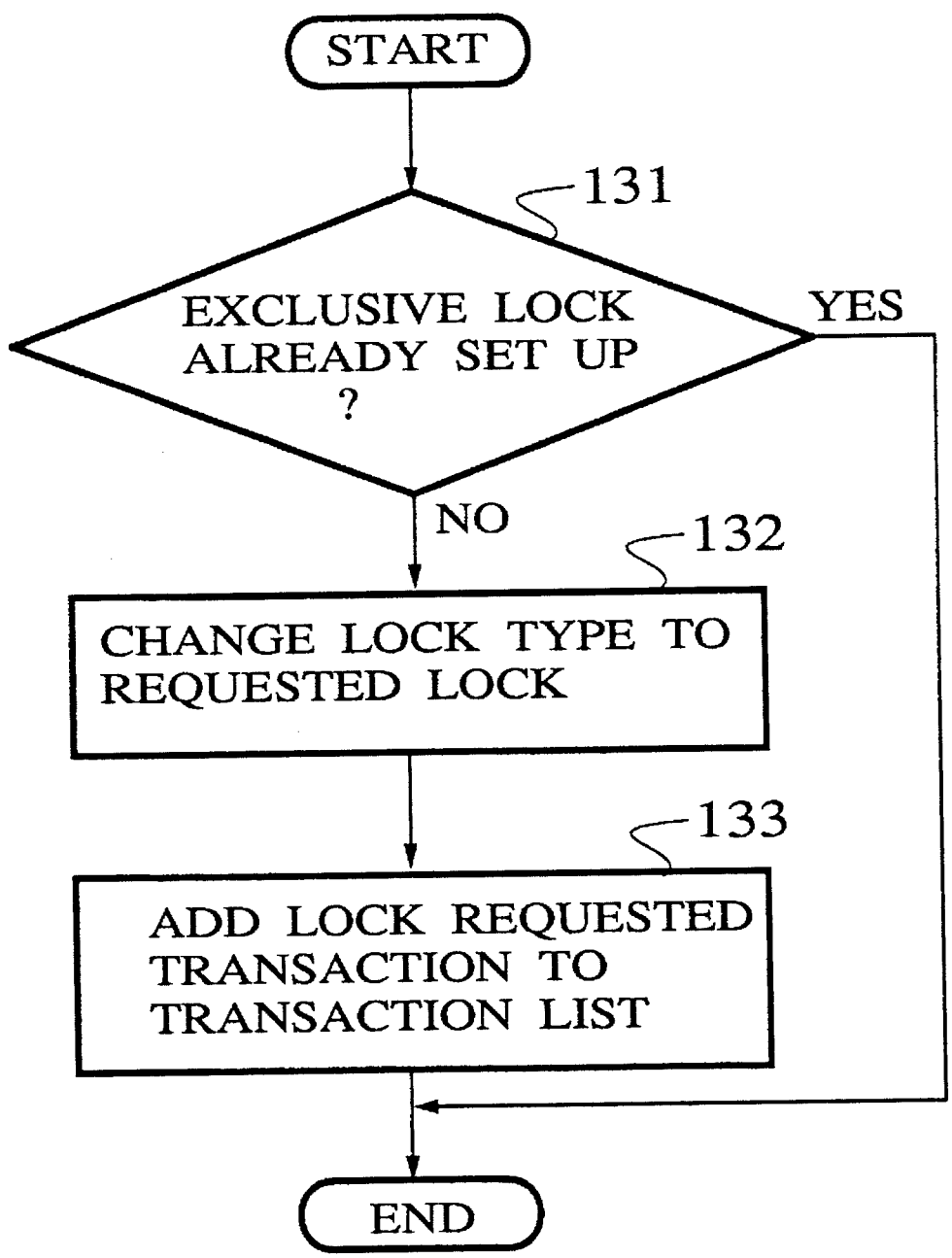
FIG. 13 is a flow chart for the operation to rewrite the locking information in a page locking table in the flow chart of FIG. 10.

Then, in a case of permitting the requested lock, the operation to rewrite the locking information in the page locking table 532 at the step 105 is carried out according to the flow chart of FIG. 13 as follows. Namely, whether the exclusive lock has already been set up for this transaction or not is judged (step 131), and if so nothing is done. If not, the type of the lock is changed to that of the requested lock (step 132) and the transaction which requested the requested lock is added to the list of transactions (step 133).

A lock release unit 534 is called up at a time of ending the transaction from the page mapping release unit 514. At this lock release unit 534, the secondary memory address of the page from which the lock is to be released from the page mapping release unit 514, and rewrites the page locking table 532 to release the lock for that page.

Thus, this operation to rewrite the page locking table 532 by the lock release unit 534 proceeds according to the flow chart of FIG. 14 as follows. Namely, the transaction for which the lock has been released is deleted from the list of transactions (step 141), and whether the list of transactions has becomes empty or not is judged (step 142). If not, nothing further is done, whereas otherwise, the locking information concerning this lock is deleted (step 143).

As described, in this first embodiment, it is possible to set up the lock for each transaction independently in the shared data mapped into the virtual space even when a plurality of transactions are executed in parallel in forms of the threads by mapping the same shared data for the different threads into the different regions in the virtual space. In other words, the different threads can make accesses to the same shared data by using different shared data identifiers and the different locks are set up for different shared data identifiers, so that the different locks can be set up with respect to the same shared data by the different threads and the accesses in violation to the locks are detected, so as to realize the automatic locking for each thread as well as the detection of the timing for changing the locks of the shared data.

Then, at a time of setting up the lock, the arbitration of the locks among the different shared data identifiers with respect to the same shared data is carried out, so as to enable the parallel execution of the threads while maintaining the consistency of the shared data.

In addition, the locking is realized by utilizing the page protection function of the MMU 40, so that the access in violation to the lock setting can be detected as the exception of the MMU 40, and consequently there is no need to require the explicit programming of the set up and release of the locks.

Moreover, the virtual address can be used as the identifier of the shared data, as the same shared data are mapped into the different regions in the virtual space for different threads and the same shared data have different virtual addresses for different threads, so that it is possible make accesses to the shared data at high speed.

Next, the second embodiment of the shared data management scheme according to the present invention will be described. This second embodiment is directed to the realization of the nested transaction incorporating the parent and child relationships among the transactions, in which the child transaction inherits the lock of the parent transaction, while the parent transaction inherits the lock obtained by the child transaction when the child transaction is ended.

Figures 14, 15:
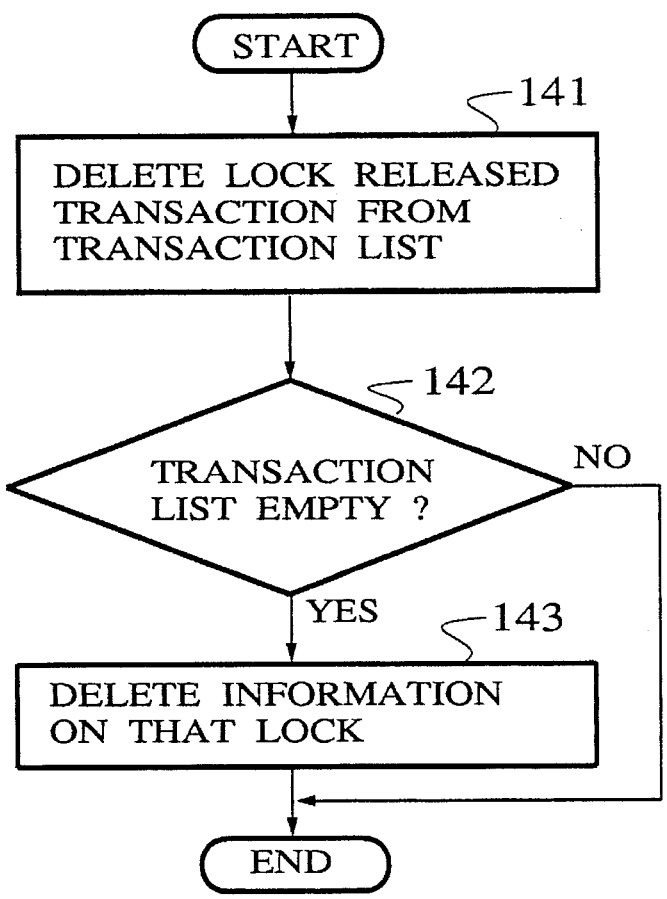
FIG. 14 is a flow chart for the operation to rewrite a page locking table by a lock release unit in the lock arbitration unit of FIG. 9.
FIG. 15 is an illustration of an exemplary program for a nested transaction to be handled by the second embodiment of the shared data management scheme according to the present invention.
Figures 16, 17:
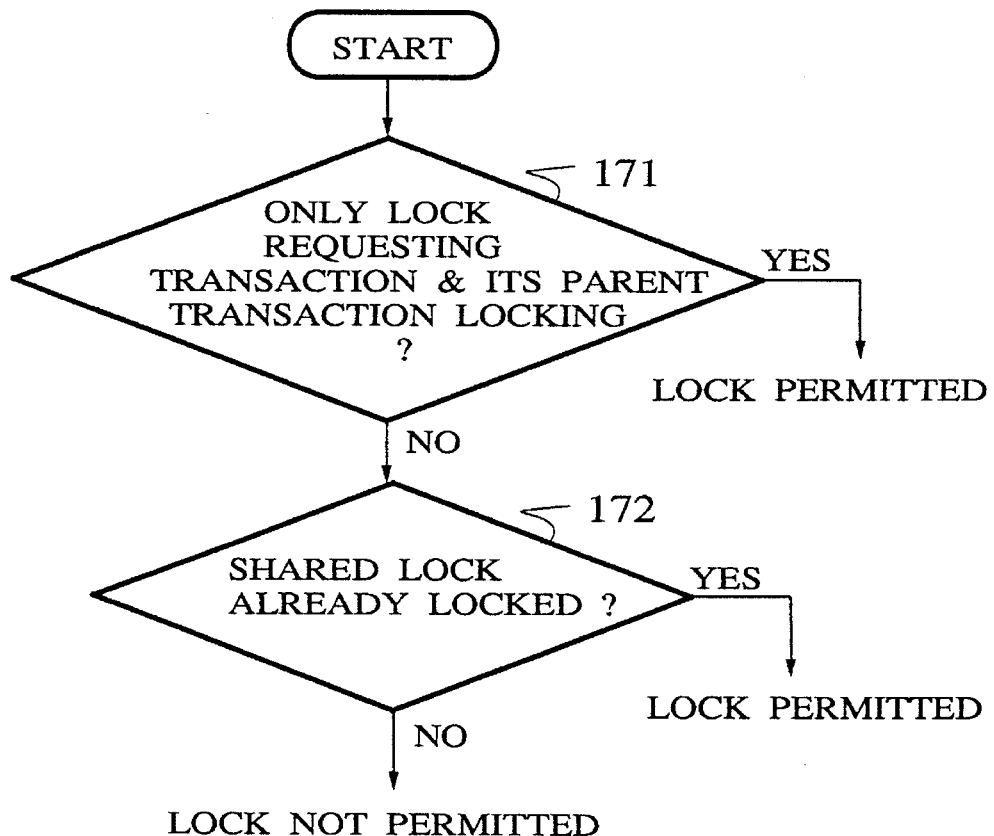
FIG. 16 is an illustration of an exemplary program for a nested transaction having a plurality of child transactions to be executed in parallel, which is to be handled by the second embodiment of the shared data management scheme according to the present invention.
FIG. 17 is a flow chart for the operation of judging whether the requested lock is permissible or not in the second embodiment of the shared data management scheme in a case the requested lock is the shared lock.

An exemplary program for such a nested transaction is shown in FIG. 15. Here, it is possible for a plurality of child transactions to be executed in parallel, provided that the arbitration of the locks among the child transactions is made. An exemplary program for such a nested transaction in which a plurality of child transactions are executed in parallel is shown in FIG. 16. Here, in FIG. 16, the paragraph "para {}" is a syntax for indicating that each transaction enclosed by them is operating independently as a thread. The details concerning the conflict relationships among the locks of the transactions are already well known in the standard textbook on the nested transaction.

In this second embodiment, in order to deal with such a nested transaction, the first embodiment described above is modified such that the operations of the lock arbitration unit 530 and the page mapping release unit 514 of the identifier management unit 510 are modified as follows.

Figure 18:
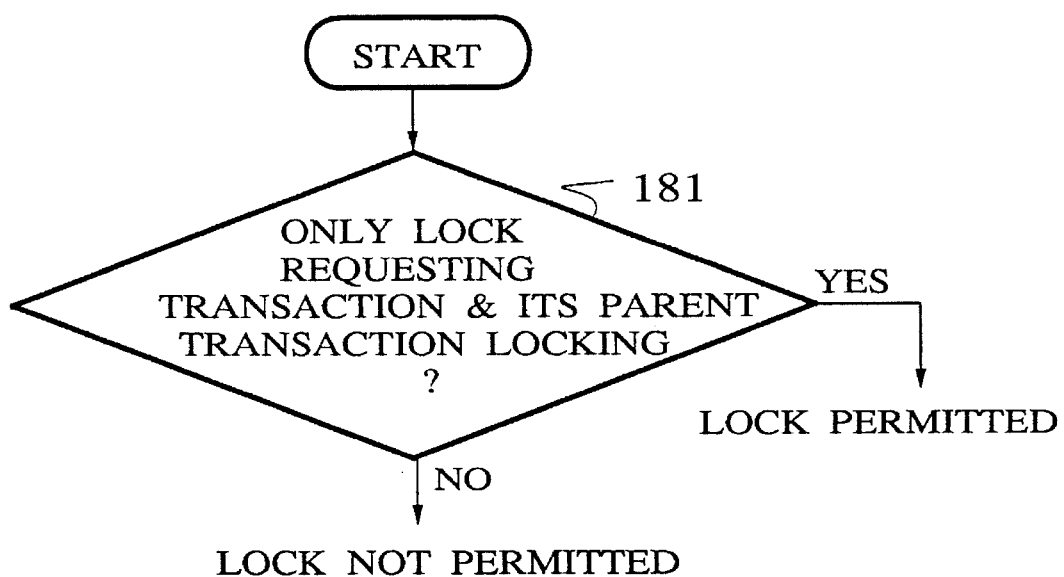
FIG. 18 is a flow chart for the operation of judging whether the requested lock is permissible or not in the second embodiment of the shared data management scheme in a case the requested lock is the exclusive lock.

Namely, the conflict judgement unit 531 of the lock arbitration unit 530 makes the judgement of whether the requested lock is permissible or not as indicated in FIG. 17 in a case the requested lock is the shared lock, and as indicated in FIG. 18 in a case the requested lock is the exclusive lock, instead of FIG. 11 and FIG. 12 used in the first embodiment described above. In a case of FIG. 17, whether only the transaction which is requesting the lock and its parent transaction are locking or not is judged (step 171), and if so the requested lock is permitted. Otherwise, whether the shared lock is already locked or not is judged (step 172), and if so the requested lock is permitted, whereas otherwise the requested lock is not permitted. On the other hand, in a case of FIG. 18, whether only the transaction which is requesting the lock and its parent transaction are locking or not is judged (step 181), and if so the requested lock is permitted, whereas otherwise the requested lock is not permitted.

Figure 19:
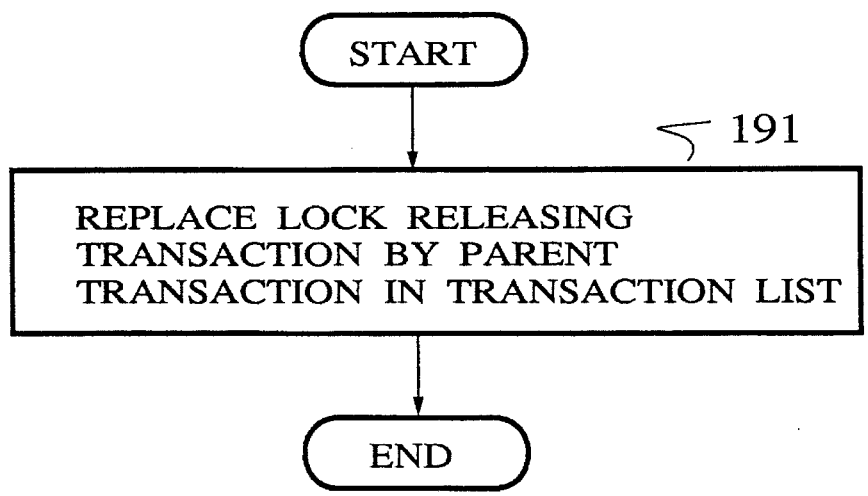
FIG. 19 is a flow chart for the operation to rewrite a page locking table by a lock release unit in the second embodiment of the shared data management scheme.

Also, the lock release unit 534 operates according to the flow chart of FIG. 19, in which the transaction which is releasing the lock is replaced by its parent transaction in the list of transactions (step 191).

Figure 20:
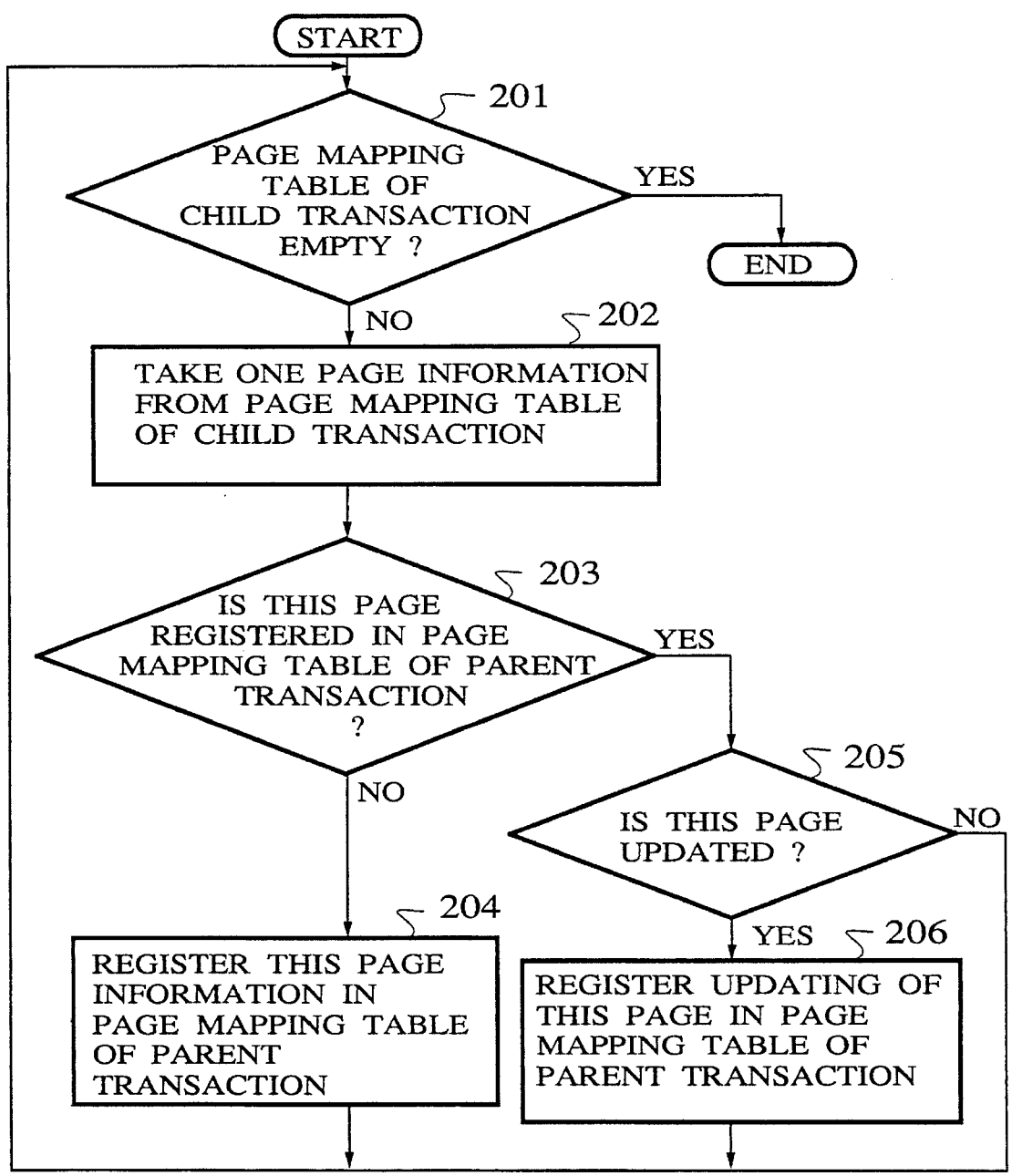
FIG. 20 is a flow chart for the operation of a page mapping release unit in the second embodiment of the shared data management scheme.

In addition, at a time of ending the child transaction, the page mapping release unit 514 calls up the lock release unit 534 for the correspondence relationship in the page mapping table 512 of that child transaction, and merges that correspondence relationship to the page mapping table 512 of its parent transaction according to the flow chart of FIG. 20 as follows.

Namely, whether the page mapping table 512 of the child transaction is empty or not is judged (step 201) and if so, nothing is done. If not, each page information in the page mapping table 512 of the child transaction is taken out one by one (step 202), and whether that page is registered in the page mapping table 512 of the parent transaction or not is judged (step 203). If not, that page information is registered into the page mapping table 512 of the parent transaction (step 204), whereas otherwise, whether that page has been updated or not is judged (step 205) and if not, nothing is done. Otherwise, the updating of that page is registered into the page mapping table 512 of the parent transaction (step 206). This operation is repeated for all the page information in the page mapping table 512 of the child transaction until the page mapping table 512 of the child transaction becomes empty.

When the child transaction is ended, the mapping of the shared data made by this child transaction and the updated page are not written back to the secondary memory even if this child transaction has been executed successfully, because the releasing of the mapping and the writing back of the updated page to the secondary memory are to be carried out only at a time of ending a top (parentless) transaction.

Next, the third embodiment of the shared data management scheme according to the present invention will be described. In the above embodiments, the virtual address has been used as the identifier of the shared data such that the access to the shared data according to the shared data identifier can be realized directly by the machine instructions of the computer, and in addition, the lock is realized by setting up the page protection mode of the MMU such that the access in violation to the lock setting can be detected as the exception of the MMU. In contrast, in this third embodiment, instead of using the the virtual address as the shared data identifier, a shared data management table for recording the virtual address of the shared data along with the protection mode is provided and the index of this shared data management table is used as the shared data identifier. As a consequence, there is no need to provide the shared data mapping region for each thread separately, and the single mapping region can be shared by all the threads.

Figure 21:
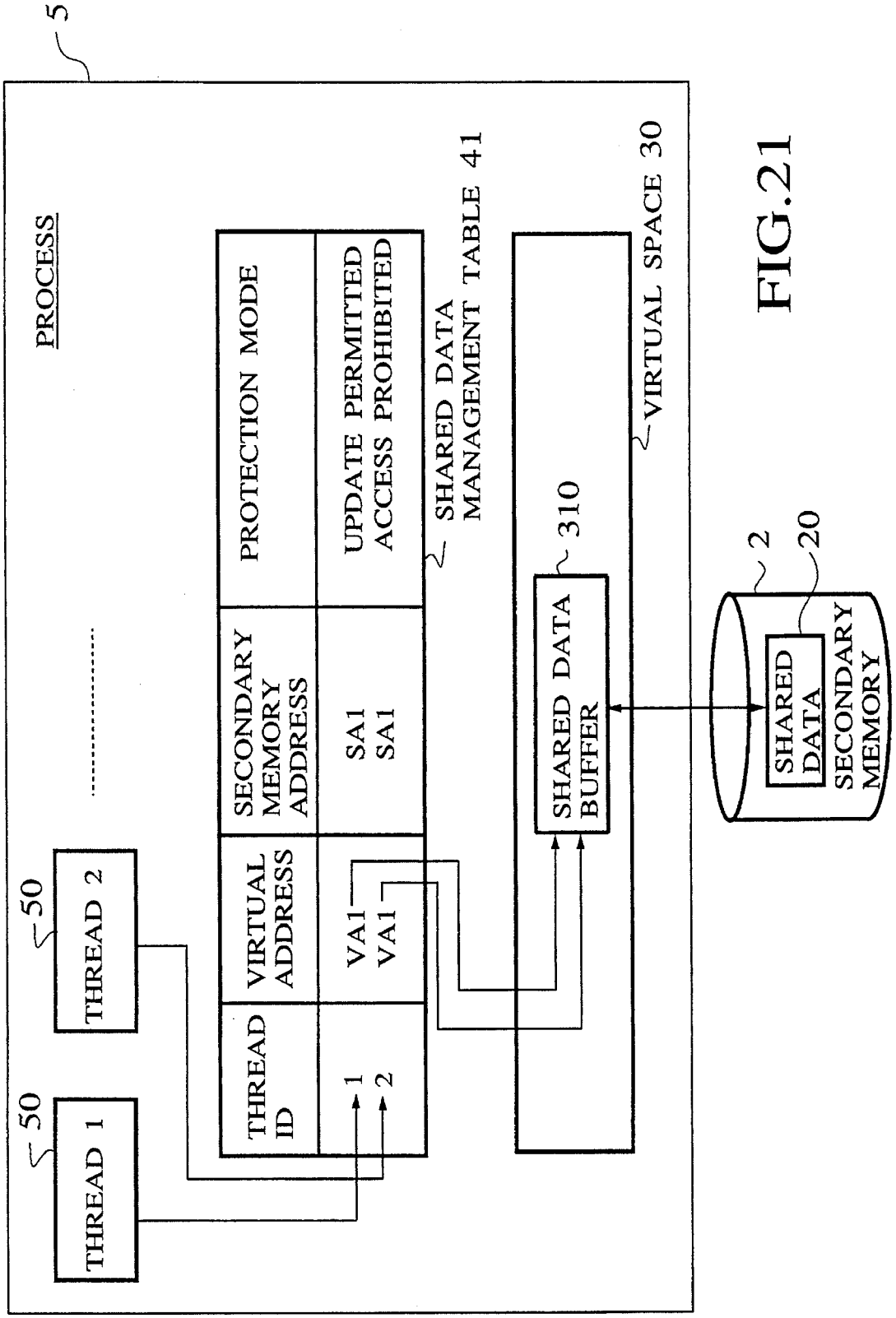
FIG. 21 is a schematic diagram of a functional configuration of the third embodiment of the shared data management scheme according to the present invention.

More specifically, FIG. 21 shows a functional configuration in this third embodiment, in which the process 5 has multiple threads 50, the virtual space 30 with a shared data buffer 310 as the common shared data mapping region, and the shared data management table 41 in which each entry registers a thread ID, a virtual address, a secondary memory address, and a protection mode in correspondence.

FIG. 22 shows an exemplary program for the transaction processing in this third embodiment, in which the access to the shared data according to the shared data identifier is realized by means of the software. In this program of FIG. 22, "map2" returns the shared data identifier, and "deref_rhs" and "deref_lhs" converts this shared data identifier into the virtual address, while judging whether it is an access in violation to the lock setting or not. This "map2" receives the secondary memory address of the shared data, maps the page of that secondary memory address into the virtual space if it has not yet been mapped, and registers the virtual address at which that page has been mapped and that secondary memory address together in the shared data management table 41. Here, whether a particular page has already been mapped or not can be easily judged by checking the shared data management table 41. In a case of registering the information for the new shared data into the shared data management table 41, the protection mode field in that entry is set to the access prohibited mode. Finally, "map2" returns the index of the shared data management table 41, in response to which the "deref_rhs" and "deref_lhs" converts that index into the virtual address.

Then, "deref_rhs" further checks if the protection mode of the shared data specified by that index is in the reading permitted mode or not. If not, the lock arbitration unit 580 is called up and the permission for the shared lock is obtained, and then the protection mode is rewritten to be the reading permitted mode. Similarly, the "deref_lhs" further checks if the protection mode of the shared data specified by that index is in the updating permitted mode or not. If not, the lock arbitration unit 530 is called up and the permission for the exclusive lock is obtained, and then the protection mode is rewritten to be the updating permitted mode.

This program of FIG. 22 can be produced automatically by the compiler from the program such as that shown in FIG. 4 by checking the types of the variables. This third embodiment is advantageous in that there is no need to map the shared data in duplicate so that the virtual space can be used economically.

It is to be noted that, in the embodiments described above, there arises a problem when the virtual address (shared data identifier) of the shared data is to be handed over from one transaction (thread) to another transaction (thread) by means of the global variable, because this allows another transaction (thread) to make an access to the shared data under the lock set up by one transaction (thread). In such a case, however, this problem can be avoided by prohibiting the substitution of the shared data identifier into anything other than the local variables of the transaction, which can be achieved by introducing the new syntax as shown in FIG. 28. Namely, the local variables of the transaction are those variables which are declared in "transaction {}", so that the substitution of the shared data identifier into anything other than the local variables can be easily detected by the compiler and the compile error can be issued.

It is also to be noted that, in the embodiments described above, a case of handling the shared data in the secondary memory has been described, but the present invention is equally applicable to a case of handling the shared data which are present only in the main memory. In such a case, it suffices to set the main memory device as the mapping target instead of the secondary memory.

As described, according to the present invention, the different locks can be set up for different threads with respect to the same shared data, so that the automatic locking in units of threads can be realized. As a result, the programming for the multi-threading can be simplified considerably. In particular, in a case of handling the data in the secondary memory as the shared data, it becomes possible to prevent the occurrence of the conventionally problematic situation in which the erroneous data are left in the secondary memory because of the incomplete lock setting and these erroneous data affect the other programs. Also, there is no need to carry out the exclusive control every time an access to the shared data is made, so that the program for the multi-threading can be executed at high speed. As a consequence, it becomes possible to make the access to the shared data at high speed because of the omission of the exclusive control, while it also becomes possible to prevent the lowering of the parallelism that could have been caused by the setting up of the critical section in the exclusive control conventionally.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for managing shared data to be accessed by multiple threads, comprising the steps of:

assigning different shared data identifiers, for identical shared data, to different threads, said different shared data identifiers to be used in identifying the shared data at a time of making accesses to the shared data;

setting up different locks for said different shared data identifiers assigned at the assigning step; and detecting an access to the shared data in violation of at least one of the locks set up at the setting step among the accesses to the shared data made from the threads, said detecting being in accordance with the shared data identifiers assigned at the assigning step.

2. The method of claim 1, wherein at the setting step, the locks are set up by making an arbitration among the locks for the different shared data identifiers used in making the accesses to identical shared data.

3. The method of claim 1, wherein identical shared data are mapped to a plurality of different regions in a virtual space allocated to the different threads to be executed concurrently in a process, and at the assigning step, the shared data identifiers are given by virtual addresses of the different regions in the virtual space to which the identical shared data are mapped.

4. The method of claim 1, wherein identical shared data are mapped to a region in a virtual space commonly allocated to all the threads to be executed concurrently in a process, and at the assigning step, the shared data identifiers are given by indices of a shared data management table for registering a virtual address of the shared data for each thread and a protection mode of the shared data for each thread in correspondence to each index assigned to each thread.

5. A method for managing shared data to be accessed by multiple threads, comprising the steps of:

(a) mapping the shared data required in an execution of each thread to a region exclusively allocated to said each thread in a virtual space, in units of pages;

(b) setting up a page protection of a memory management unit for managing the virtual space, with respect to each page to which the shared data are mapped at the step (a); and (c) automatically setting up a lock for the shared data mapped to each page in response to an occurrence of an exception due to the page protection of the memory management unit set up by the step (b) which is caused by an access to the shared data mapped to each page from said each thread.

6. The method of claim 5, wherein at the step (b), the page protection is set to be in an access prohibited mode initially, and at the step (c), the page protection is changed to be in an access permitted mode in response to the occurrence of the exception.

7. The method of claim 5, wherein each of the steps (a), (b), and (c) is executed within a transaction, and further comprising the step of automatically releasing the lock for the shared data at an end of the transaction.

8. The method of claim 5, wherein the lock to be set up at the step (c) includes a shared lock and an exclusive lock, and at the step (c), the shared lock is set up when the access to the shared data mapped to each page from said each thread which caused the exception is an access for reading the shared data mapped to each page, and the exclusive lock is set up when the access to the shared data mapped to each page from said each thread which caused the exception is an access for updating the shared data mapped to each page.

9. The method of claim 8, wherein at the step (c), the shared lock for the shared data is set up unless the exclusive lock for the same shared data is already set up for another thread, and the exclusive lock for the shared data is set up unless one of the shared lock and the exclusive lock for the same shared data is already set up for another thread.

10. The method of claim 5, wherein the shared data are identified by a virtual address of the region to which the shared data are mapped in the virtual space.

11. The method of claim 5, wherein each of the steps (a), (b), and (c) are executed within nested transactions.

12. The method of claim 11, wherein at an end of each transaction of the nested transactions, the lock for the shared data mapped to each page is released only when said each transaction is a parentless transaction in the nested transactions, and in a case said each transaction is a child transaction of the nested transactions, the lock for the shared data mapped to each page is inherited to a parent transaction of said child transaction, in response to an end of the execution of said child transaction.

13. The method of claim 11, wherein child transactions of a parent transaction are executed in parallel as threads.

14. A system for managing shared data to be accessed by multiple threads, comprising:

means for assigning different shared data identifiers, for identical shared data, to different threads, said different shared data identifiers to be used in identifying the shared data at a time of making accesses to the shared data;

means for setting up different locks for said different shared data identifiers assigned at the assigning step; and means for detecting an access to the shared data in violation of at least one of the locks set up at the setting step among the accesses to the shared data made from the threads, said detecting being in accordance with the shared data identifiers assigned at the assigning step.

15. A system for managing shared data to be accessed by multiple threads, comprising:

means for mapping the shared data required in an execution of each thread to a region exclusively allocated to said each thread in a virtual space, in units of pages;

means for setting up a page protection of a memory management unit for managing the virtual space, with respect to each page to which the shared data are mapped by the mapping means; and means for automatically setting up a lock for the shared data mapped to each page in response to an occurrence of an exception due to the page protection of the memory management unit set up by the setting means which is caused by an access to the shared data mapped to each page from said each thread.

* * * * *